Patented May 10, 1932

UNITED STATES PATENT OFFICE

LEOPOLD LASKA AND OSKAR HALLER, OF OFFENBACH-ON-THE-MAIN, GERMANY, ASSIGNORS TO GENERAL ANILINE WORKS, INC., OF NEW YORK, N. Y., A CORPORATION OF DELAWARE

ARYLIDES OF NAPHTHALENE DICARBOXYLIC ACIDS AND PROCESS OF MAKING SAME

No Drawing. Application filed October 23, 1929, Serial No. 401,973, and in Germany November 1, 1928.

Our present invention relates to new and valuable condensation products of the naphthalene series and to a process of preparing the same, more particularly it relates to compounds which correspond to the general formula:

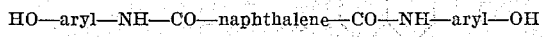

HO—aryl—NH—CO—naphthalene—CO—NH—aryl—OH wherein one CO-group is attached to the naphthalene nucleus represented by the following scheme

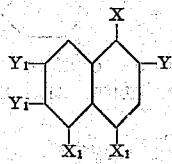

in the X-position and the other CO-group in one of the $X_1$-positions, or one CO-group is attached to the naphthalene nucleus in the Y-position and the other CO-group in one of the $Y_1$-positions, and wherein each aryl nucleus may contain further substituents.

These compounds are obtainable according to our process by condensing a naphthalene dicarboxylic acid chloride, in which the carboxylic acid chloride groups are attached in the above signified positions of the naphthalene nucleus, with a hydroxy-aryl-amine. Particularly valuable products are those in which the one CO-group is attached to the naphthalene nucleus in the 1-position and the other CO-group in the 4- or 5-position.

The naphthalene dicarboxylic acid chlorides may also be applied in situ. In this case instead of the chlorides the corresponding carboxylic acids themselves are used with the addition of a chloride of phosphorus.

The reaction is advantageously carried out in the presence of a diluent which may be capable of binding acids.

In the form of their alkali metal salts the new compounds, though containing neither sulfonic nor carboxylic acid groups, are soluble in water in a degree sufficient for technical purposes and show an affinity to the vegetable fiber which permits their use for impregnating cotton goods.

In order to further illustrate our invention the following examples are given, the parts being by weight and all temperatures in centigrade degrees; but we wish it to be understood that we are not limited to the particular products nor reaction conditions mentioned therein.

*Example 1*

113 parts of naphthalene 1.5-dicarboxylic acid and 109 parts of 3-amino-1-phenol are introduced into 700 parts of dimethyl-aniline. Then 60 parts of phosphorus trichloride are allowed to run in slowly at 70° to 80°. The mass is heated at 110° for 5 hours and thereafter poured into dilute hydrochloric acid. The precipitate formed is filtered off and stirred with a sodium carbonate solution until it shows an alkaline reaction. Then dimethylaniline is removed by means of steam and the reaction product is further purified by dissolving it in a caustic soda solution and again precipitating with carbonic acid.

In this manner naphthalene-1.5-dicarboxylic-di-(3'-hydroxy-phenylamide) is obtained. It corresponds to the formula:

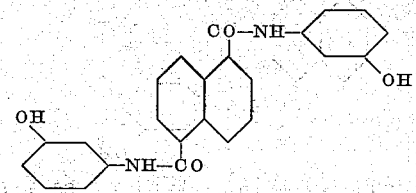

and melts at 295°–298°.

In an analogous manner naphthalene-1.5-dicarboxylic-di(4'-hydroxy-phenylamide) melting at 325°–330° may be produced by starting from 4-amino-phenol instead of 3-amino-phenol.

Both compounds are insoluble in the usual organic solvents.

The reaction takes place in an analogous manner, yielding isomeric products, when starting from naphthalene 2.6- or 2.7-dicarboxylic-acids.

*Example 2*

113 parts of 1.5-naphthalene-dicarboxylic acid, 123 parts of 1-methyl-2-amino-4-hydroxy-benzene, 700 parts of dimethylaniline and 60 parts of phosphorus trichloride are allowed to react in the manner described in Example 1. Naphthalene-1.5-dicarboxylic-di(2'-methyl-5'-hydroxy-phenylamide) thus obtained corresponds to the formula:

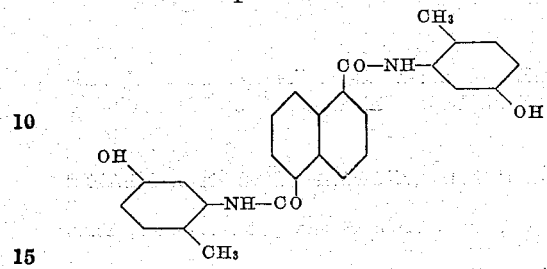

It melts at 190°–193° and may also be purified by dissolving it in a caustic soda solution and precipitating with carbonic acid.

A similar product is obtained by replacing in this example 1-methyl-2-amino-4-hydroxy-benzene by 1-methyl-2-amino-5-hydroxy-benzene.

Example 3

108 parts of naphthalene-1.4-dicarboxylic acid and 109 parts of 3-amino-phenol are introduced into 700 parts of dimethylaniline. Then at 60°–70° 60 parts of phosphorus trichloride are gradually allowed to run in. The temperature is raised to 110° and thus maintained for 8 hours. Thereafter the mass is poured into dilute hydrochloric acid. The precipitate formed is filtered off, mixed with an excess of a soda solution and freed from dimethylaniline possibly still adhering by means of steam. The condensation product is purified as described in the foregoing examples. It corresponds to the formula:

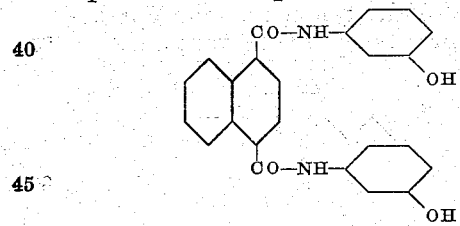

and melts at 270°–273°. With the same success pyridine may be used instead of dimethylaniline.

Example 4

253 parts of naphthalene-1.4-dicarboxylic acid chloride and 218 parts of 3-amino-phenol are introduced into 500 parts of benzine. The mass is heated and kept at boiling temperature for 8 hours and then mixed with an excess of a soda solution. The solvent is distilled off by steam and the reaction product purified in the above mentioned manner. It is identical to that of Example 3.

Example 5

A mixture of 253 parts of naphthalene-1.5-dicarboxylic acid chloride, 218 parts of 3-amino-phenol and 500 parts of acetone is boiled for 8 hours. The mass is worked up according to the foregoing examples and yields a product identical to that of Example 1.

Example 6

253 parts of naphthalene-1.4-dicarboxylic acid chloride and 318 parts of 1-amino-5-naphthol are introduced into 3000 parts of acetone. The mass is heated and kept at boiling temperature for 8 hours, then poured into water and made alkaline by means of soda. The formed precipitate is filtered off and treated at 30°–40° with dilute hydrochloric acid. The residue is purified as described in the foregoing examples. The condensation product thus obtained corresponds to the formula:

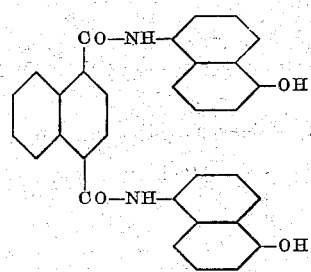

It is soluble in caustic alkali solutions, insoluble in soda solution and in organic solvents.

Example 7

A mixture of 253 parts naphthalene 1.5-dicarboxylic acid chloride, 318 parts of 1-amino-7-naphthol and 3000 parts of acetone is treated according to Example 6. The product thus obtained corresponds to the formula:

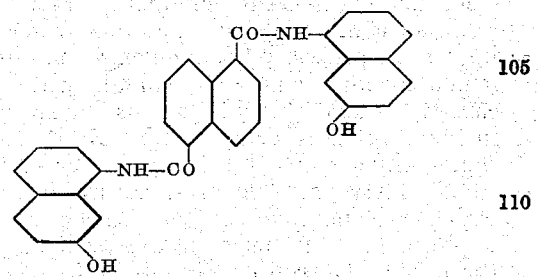

It shows similar properties to that of Example 6.

The condensation of naphthalene 1.5-dicarboxylic acid chloride with 1-amino-5-naphthol yields a similar product.

Example 8

253 parts of naphthalene 1.4-discharboxylic acid chloride and 318 parts of 1-amino-7-naphthol are introduced into 2500 parts of dimethylaniline. The temperature is gradually raised to 80°–90° and thus maintained for 8 hours. Then the mass is poured into dilute hydrochloric acid. The precipitate is filtered off, mixed with an excess of a soda solution and freed from dimethylaniline by steam distillation. The condensation product may be further purified by dissolving it in a caustic soda solution and precipitating with carbonic acid. It corresponds to the formula:

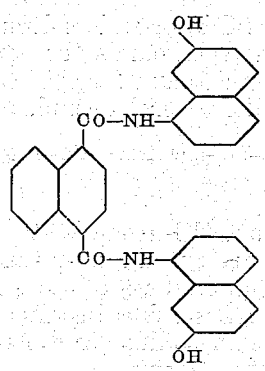

It exhibits similar properties as the products of the foregoing examples.

We claim:

1. A process which comprises treating a naphthalene dicarboxylic acid chloride of the formula

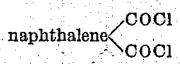

in which one CO-group is attached to the naphthalene nucleus represented by the following scheme

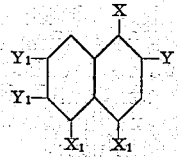

in the X-position and the other CO-group in one of the $X_1$-positions, or one CO-group is attached to the naphthalene nucleus in the Y-position and the other CO-group in one of the $Y_1$-positions, with a hydroxy-amino compound of the general formula $H_2N-R-OH$ wherein R stands for a benzene, toluene or naphthalene radicle, in the presence of a diluent.

2. A process which comprises treating a naphthalene dicarboxylic acid chloride of the formula

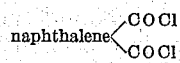

in which one CO-group is attached to the naphthalene nucleus represented by the following scheme

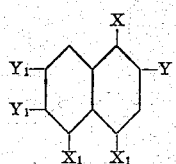

in the X-position and the other CO-group in one of the $X_1$-positions, or one CO-group is attached to the naphthalene nucleus in the Y-position and the other CO-group in one of the $Y_1$-positions, with a hydroxy-amino compound of the general formula $H_2N-R-OH$ wherein R stands for a benzene, toluene or naphthalene radicle, in the presence of a diluent capable of binding acids.

3. A process which comprises treating a naphthalene dicarboxylic acid chloride of the formula

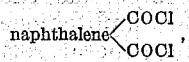

in which the one COCl-group is attached to the naphthalene nucleus in the 1-position and the other CO-group in the 4- or 5-position, with a hydroxy-amino compound of the general formula $H_2N-R-OH$ wherein R stands for a benzene, toluene or naphthalene radicle, in the presence of a diluent capable of binding acids.

4. A process which comprises treating a naphthalene dicarboxylic acid of the formula

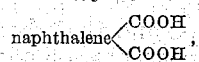

in which the one COOH-group is attached to the naphthalene nucleus in the 1-position and the other COOH-group in the 4- or 5-position, with a chloride of phosphorus and a hydroxy-amino compound of the general formula $H_2N-R-OH$ wherein R stands for a benzene, toluene or naphthalene radicle in the presence of an acid-binding agent.

5. A process which comprises treating a naphthalene dicarboxylic acid of the formula

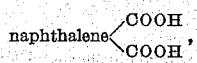

in which the one COOH-group is attached to the naphthalene nucleus in the 1-position and the other COOH-group in the 4- or 5-position, with phosphorus trichloride and a hydroxy-amino compound of the general formula $H_2N-R-OH$ wherein R stands for a benzene, toluene or naphthalene radicle in the presence of a tertiary organic base.

6. A process which comprises treating a naphthalene dicarboxylic acid of the formula

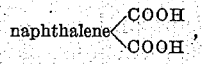

in which the one COOH-group is attached to the naphthalene nucleus in the 1-position and the other COOH-group in the 4- or 5-position, with phosphorus trichloride and a hydroxy-phenylamine of the general formula:

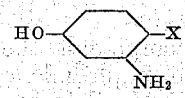

wherein X means hydrogen or methyl, in the presence of a tertiary organic base.

7. A process which comprises treating a naphthalene dicarboxylic acid of the formula

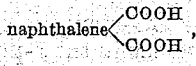

in which the one COOH-group is attached to the naphthalene nucleus in the 1-position and the other COOH-group in the 4- or 5-position, with phosphorus trichloride and 3-amino-phenol, in the presence of a tertiary organic base.

8. As new compounds the condensation products of the naphthalene series corresponding to the general formula:

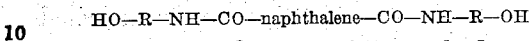
HO—R—NH—CO—naphthalene—CO—NH—R—OH wherein one CO-group is attached to the naphthalene nucleus represented by the following scheme

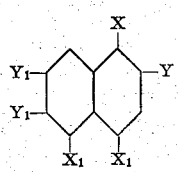

in the X-position and the other CO-group in one of the $X_1$-positions, or one CO-group is attached to the naphthalene nucleus in the Y-position and the other CO-group in one of the $Y_1$-positions, and wherein R stands for a benzene, toluene or naphthalene radicle, which compounds are soluble in caustic alkalies but insoluble in sodium carbonate solution and in organic solvents.

9. As new compounds the condensation products of the naphthalene series corresponding to the general formula

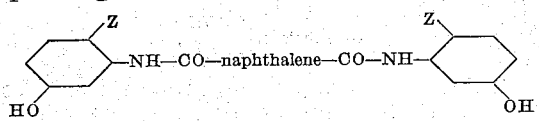

wherein one CO-group is attached to the naphthalene nucleus represented by the following scheme

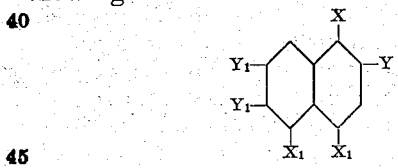

in the X-position and the other CO-group in one of the $X_1$-positions, or one CO-group is attached to the naphthalene nucleus in the Y-position and the other CO-group in one of the $Y_1$-positions, and wherein the Z's mean hydrogen or methyl groups, which compounds are soluble in caustic alkalies but insoluble in sodium carbonate solution and in organic solvents.

10. As new compounds the condensation products of the naphthalene series corresponding to the general formula

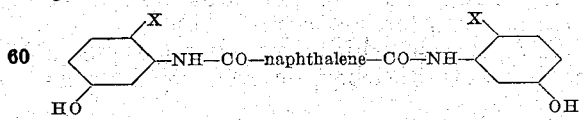

wherein the one CO-group is attached to the naphthalene nucleus in the 1-position and the other CO-group in the 4- or 5-position, and wherein the X's mean hydrogen or methyl groups, which compounds are soluble in caustic alkalies but insoluble in sodium carbonate solution and in organic solvents.

11. As new compounds the condensation products of the naphthalene series corresponding to the general formula:

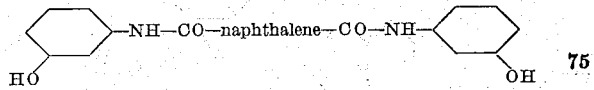

wherein the one CO-group is attached to the naphthalene nucleus in the 1-position and the other CO-group in the 4- or 5-position, which compounds are soluble in caustic alkalies but insoluble in sodium carbonate solution and in organic solvents.

12. As a new compound the condensation product of the naphthalene series corresponding to the formula:

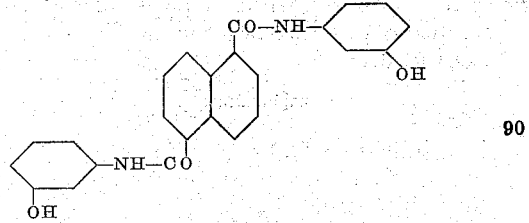

which compound is soluble in caustic alkalies but insoluble in sodium carbonate solution and in organic solvents.

13. As a new compound the condensation product of the naphthalene series corresponding to the formula:

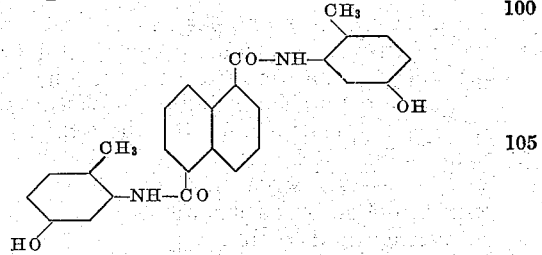

which compound is soluble in caustic alkalies but insoluble in sodium carbonate solution and in organic solvents.

14. As a new compound the condensation product of the naphthalene series corresponding to the formula:

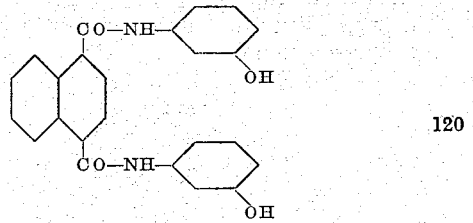

which product is soluble in caustic alkalies but insoluble in sodium carbonate solution and in organic solvents.

In testimony whereof, we affix our signatures.

LEOPOLD LASKA.
OSKAR HALLER.